(No Model.)
J. S. WASHBURN.
CRANBERRY PICKER.
No. 585,455.          Patented June 29, 1897.
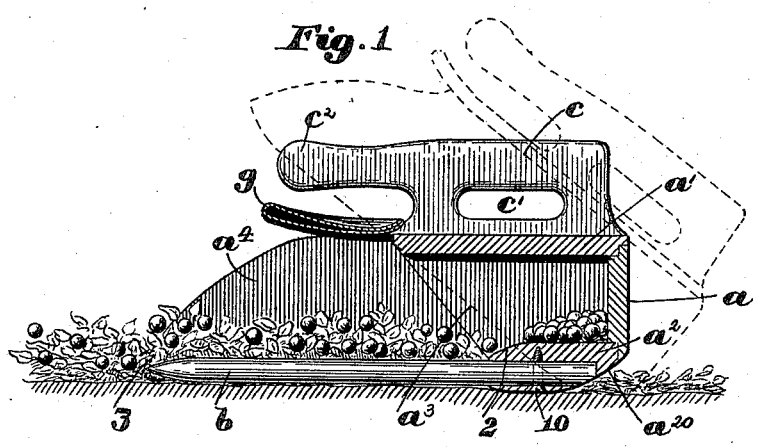
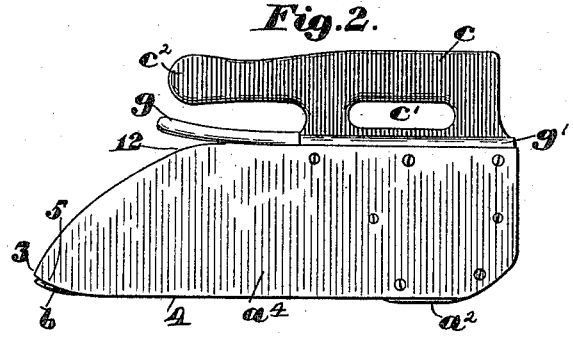
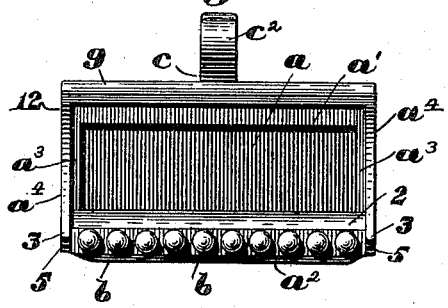
Witnesses:
Walter E. Lombard
Thomas J. Drummond
Inventor:
Joseph S. Washburn,
by Crosby & Gregory
Attys.

UNITED STATES PATENT OFFICE.

JOSEPH S. WASHBURN, OF WAREHAM, MASSACHUSETTS, ASSIGNOR OF ONE-HALF TO RICHARD A. EVERSON, OF SOUTH HANSON, MASSACHUSETTS.

CRANBERRY-PICKER.

SPECIFICATION forming part of Letters Patent No. 585,455, dated June 29, 1897.

Application filed October 7, 1896. Serial No. 608,081. (No model.)

*To all whom it may concern:*

Be it known that I, JOSEPH S. WASHBURN, of Wareham, county of Plymouth, State of Massachusetts, have invented an Improvement in Cranberry-Pickers, of which the following description, in connection with the accompanying drawings, is a specification, like letters and figures on the drawings representing like parts.

This invention has for its object the production of a novel, simple, and efficient device for picking cranberries and the like, whereby the waste is greatly reduced and the capacity very much increased.

In my invention I dispense with the movable trap or door which has been used in some classes of pickers and provide a fixed guard which projects above the entrance to the body of the picker, said guard preventing the stripped berries from escaping as they snap from the stems without in any way obstructing or reducing the size of the mouth.

I have also improved the actuating-handle of the picker, so that greater leverage is attained by the operator.

Figure 1 is a longitudinal sectional view of a cranberry-picker embodying my invention shown in position ready to strip the berries from the plants. Fig. 2 is a side elevation of the picker, and Fig. 3 is a front view thereof.

I have herein shown the picker as having a body composed of a back $a$, top $a'$, bottom $a^2$, and sides $a^3$, suitably secured together to form a rigid receptacle having an open front. The sides $a^3$ themselves or extensions $a^4$, as herein shown, project from the body forwardly (see Figs. 1 and 2) and are pointed, as at 3, the bottom edges 4 of said extensions being slightly upcurved at 5 toward the points to enable the picker to be easily slid along over the ground when in use. A series of tines or strippers $b$, pointed at their outer ends, are inserted in holes in the bottom $a^2$, as clearly shown in Fig. 1, and preferably secured in place by screws 10 or any other suitable fastening, the strippers projecting between the side extensions $a^4$ and being close enough to prevent the passage of berries between them. A handle $c$ is secured to the top $a'$, having a slot or opening $c'$ for the fingers of the hand of the operator when the picker is pushed forward along the ground, at such time the tines $b$ passing through the stems, while the berries lie above the tines, as shown in Fig. 1. The operator then tips the picker into dotted-line position, Fig. 1, turning it on the preferably-convexed part or face $a^{20}$ of the bottom $a^2$, to strip the berries from the stems. I extend the handle $c$ forward at $c^2$ to form a second handhold, so the operator can grasp it with his free hand when turning the picker up, making the work easier by reason of the greater leverage attained.

When the berries are stripped, they tend to fly out over the top $a'$ of the body onto the ground, but I prevent this by mounting a guard $g$ over the extensions $a^4$ and extended beyond the top $a'$ and above the mouth of the scoop-like body, the mouth, however, being at all times open and unobstructed. The berries strike against the guard and are thrown back onto the tines $b$, traveling thence to the body portion of the picker, the leading edges of the extensions $a^4$ curving up to the under side of the guard, as at 12, Fig. 2, to prevent vines or stems from catching between them.

The guard $g$ may for lightness be made of cloth or canvas mounted on arms or supports $g'$, secured to the picker body, or it may be made of any light strong material.

The picker body and preferably the tines $b$ are made of wood, thereby combining strength with light weight and ease of movement.

Referring to Fig. 1, I have shown the front edge of the bottom $a^2$ as beveled at 2 to assist the berries in passing from the strippers or tines $b$ onto the bottom of the body portion.

Having fully described my invenvion, what I claim, and desire to secure by Letters Patent, is—

1. A berry-picker comprising a body portion having forwardly-extended sides, strippers or tines fixedly extended from the body portion and forming the bottom between said sides, and a fixed guard above the strippers the mouth of the picker being open and unobstructed, substantially as described.

2. A berry-picker comprising a body portion having extended sides upcurved at their lower, front corners and upwardly and rearwardly inclined at their front edges, tines or strippers fixedly mounted in the bottom of the body and projecting between the extended sides to the front corners thereof, and a handle on said body, the handle having a forwardly-projecting portion to form a second handhold, substantially as described.

3. A berry-picker comprising a body portion having extended sides and a bottom transversely beveled at its front edge, tines or strippers mounted in said bottom below the beveled edge thereof, and a fixed guard mounted on the body and extended from one to the other side and over the tines for a portion of their length to leave an open, unobstructed mouth, substantially as described.

In testimony whereof I have signed my name to this specification in the presence of two subscribing witnesses.

JOSEPH S. WASHBURN.

Witnesses:
LOUIS C. WILLIAMS,
NATHAN L. FOWLER.